United States Patent [19]

Schön et al.

[11] Patent Number: 5,328,978
[45] Date of Patent: Jul. 12, 1994

[54] TRIAZINE/FORMALDEHYDE RESIN

[75] Inventors: Manfred Schön, Rodgau; Jürgen Ott, Bad Vilbel; Uwe Kubillus; Elif Tas, both of Weisbaden, all of Fed. Rep. of Germany

[73] Assignee: Cassella AG, Frankfurt, Fed. Rep. of Germany

[21] Appl. No.: 142,006

[22] Filed: Oct. 28, 1993

[30] Foreign Application Priority Data

Nov. 6, 1992 [DE] Fed. Rep. of Germany ....... 4237515

[51] Int. Cl.$^5$ .............................................. C08G 12/30
[52] U.S. Cl. ..................... 528/254; 528/230; 528/253; 528/258; 528/261; 525/509; 525/510; 525/512; 525/518; 428/524
[58] Field of Search ............... 528/230, 253, 254, 258, 528/261; 525/509, 510, 512, 518; 428/524

[56] References Cited

U.S. PATENT DOCUMENTS 3,663,389  5/1972  Koral et al. .......................... 204/181
3,894,993  7/1975  Blank ................................... 528/211
4,945,961  3/1976  Blank ................................... 524/595

Primary Examiner—Samuel A. Acquah
Attorney, Agent, or Firm—Connolly & Hutz

[57]  ABSTRACT

The present invention relates to a triazine/formaldehyde resin which contains a compound of the general formula I

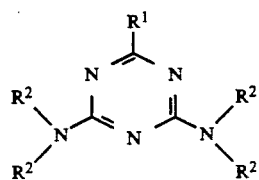

wherein $R^1$ and $R^2$ are defined as stated in claim 1, a process for its preparation and its use as a curing agent in surface coating systems.

5 Claims, No Drawings

TRIAZINE/FORMALDEHYDE RESIN

The present invention relates to a triazine/formaldehyde resin, a process for its preparation and its use as a curing agent in surface coating systems.

The use of methyl-, butyl- or isobutyl-etherified melamine/formaldehyde resins in stoving enamel systems has long been known. Films stored with these melamine/formaldehyde resins have great brittleness and it is therefore not possible to dispense with plasticizing binders which contain hydroxyl groups and are used in a solids ratio of 60:40 to 90:10 (binder:MF resin).

Improvements in this respect can be achieved if benzoguanamine and its reaction products with formaldehyde and etherification alcohols are used. Benzoguanamine resins have substantially higher flexibility, adhesion and also chemical stability to aqueous agents, such as brines and wash liquids. However, their high sensitivity to the action of light, which leads to rapid yellowing or a change of shade, is also known. For this reason, the use of these resins is limited to primer coats or household appliances, which are not exposed to direct sunlight.

The use of further guanamine derivatives, for example of aliphatic guanamines, the aliphatic radical of which contains 1 to 8 carbon atoms, in electro-dip coatings is described in the literature, in U.S. Pat. No. 3,663,389, U.S. Pat. No. 3,894,993 and U.S. Pat. No. 3,945,961. Amino-formaldehyde resins which are based on aliphatic and aromatic guanamines and cure at low temperature are mentioned in U.S. Pat. No. 4,221,683.

EP 292,306 and EP 303,441 describe etherified methylolaminotriazine condensates having cyclohexyl and norbornyl substituents, which have advantages in the weather resistance, gloss and flexibility;. The reactivity and the achievable solids content of the coating are disadvantages.

It is said that these disadvantages can be overcome by using etherified and methylolated aliphatic guanamines in a form as monomeric as possible (EP 422,402).

The present invention relates to a triazine/formaldehyde resin, characterized by a content of a compound of the general formula I

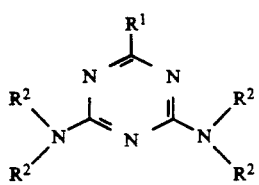

wherein
$R^1$ denotes di-$(C_1-C_6)$-alkylamino, dicyclohexylamino, diphenylamino, morpholino, piperidino or pyrrolidino, and of the four substituents $R^2$
a) 0–3 denote hydrogen,
b) 1–4 denote $R^3OCH_2-$, wherein $R^3$ denotes hydrogen or $(C_1-C_4)$-alkyl, and
c) 0–4 denote a radical of the general formula II

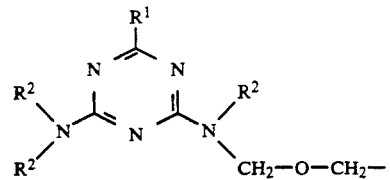

and/or a radical of the general formula III

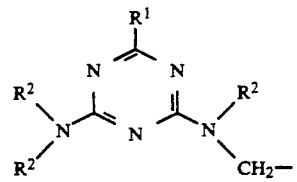

wherein
$R^1$ and $R^2$ have the abovementioned meanings.

In the general formula I, $R^1$ preferably denotes di($C_1-C_6$)-alkylamino and particularly preferably diethylamino.

The triazine/formaldehyde resins according to the invention contain the compounds of the general formula I in amounts of, preferably, 60 to 80% by weight, that is to say the solids content is preferably 60 to 80% by weight.

In addition, the triazine/formaldehyde resins according to the invention preferably contain a $(C_1-C_4)$-alkanol in amounts of, preferably, 20 to 40% by weight. Particularly suitable $(C_1-C_4)$-alkanols are n-butanol and isobutanol.

The triazine/formaldehyde resins according to the invention are usually low-viscosity to medium-viscosity liquids. A preferred viscosity range is 10 to 500 seconds efflux time, DIN 4 mm cup, and a particularly preferred range is 10 to 300 seconds efflux time, DIN 4 mm cup.

The triazine/foramldehyde resins according to the invention can be prepared by methylolating a compound of the general formula IV

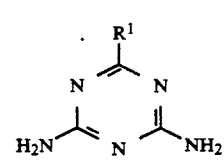

wherein
$R^1$ is defined as stated above, with formaldehyde, etherifying the product with a $(C_1-C_4)$-alkanol, removing water formed and adjusting the product thus obtained to the desired solids content with a $(C_1-C_4)$-alkanol.

The reaction of the compound of the general formula IV with formaldehyde is preferably carried out at temperatures of 0° to 150° C. and a pH of 3 to 11.

The exact reaction conditions, as well as the ratio of the compound of the general formula IV to formaldehyde, depend in particular on whether methylolation is to be effected partially or completely. An analogous situation also applies to the etherification with a $(C_1-C_4)$-alcohol.

Methylolation and etherification are usually carried out in a one-pot process.

Preferred ($C_1$–$C_4$)-alcohols for the etherification are methanol, n-butanol and isobutanol.

The compounds of the general formula IV can be prepared starting from melamine by selective bisalkylation or by reaction with an amine H-$R^1$, wherein $R^1$ is defined as stated above, with displacement of ammonia. Alternatively, the amines H-$R^1$ may also be reacted with 6-chloro-2,4-diamino-s-triazine.

The triazine/formaldehyde resins according to the invention can be combined with conventional or water-soluble or self-emulsifying externally crosslinking binders containing hydroxyl groups, such as alkyd, polyester or acrylate resins, as well as with epoxy resins, and can be cured to give resistant and rigid films.

In the case of weight ratios of binder:resin according to the invention of 60:40 to 90:10, curing at temperatures of 100° to 180° C. is complete in about 20 minutes. Curing may be effected with or without catalysis, suitable catalysts being, for example, amine salts of p-toluenesulphonic acid.

The triazine/formaldehyde resins according to the invention can therefore be used in an outstanding manner as curing agents in surface coating systems based on alkyd, polyester or acrylate resins containing hydroxyl groups or epoxy resins and/or mixtures thereof.

The present invention also relates to surface coating systems based on alkyd, polyester or acrylate resins containing hydroxyl groups or epoxy resins and/or mixtures thereof, characterized in that they contain a triazine/formaldehyde resin according to the invention.

The surface coating systems according to the invention may be aqueous or nonaqueous. Examples of surface coating systems according to the invention are those for household appliances, for example washing machines, refrigerators or cookers, but in particular for the automotive sector. Surface coating systems according to the invention for the automotive sector are in particular storing fillers, base coats, clear coats and top coats.

The surface coating systems according to the invention preferably have a weight ratio of alkyd, polyester or acrylate resin or epoxy resin: resin according to the invention of 60:40 to 90:10. They can be used in the storing range of 100° to 200° C. and in a storing time of 10 to 40 minutes in the case of filler, base coat, top coat or clear coat systems or in the forced drying range of 5 to 20 minutes at 50° to 90° C. in the case of base coat systems.

The surface coating systems according to the invention may contain auxiliaries and additives, in particular the conventional surface coating additives. Such surface coating additives are, for example, inorganic or organic (coloured) pigments, fillers, antisettling agents, antifoams and/or wetting agents, levelling agents, reactive thinners, plasticizers, (UV) stabilizers, catalysts, theology auxiliaries, such as, for example, microgels or polyurea derivatives, or additional curing agents. The stated additives can optionally be added to the surface coating systems according to the invention also directly before the processing.

By the use cf the triazine/formaldehyde resins according to the invention or of the surface coating systems according to the invention, high-quality coats are obtained, for example stone chip-resistant storing fillers having good grindability, intercoat adhesion and great hardness, base coats exhibiting rapid physical drying, a good optical effect and intercoat adhesion, clear coats having high gloss and great hardness, good weathering stability and high resilience even at relatively high storing temperatures and top coats having high gloss and high resistance. Compared with the surface coatings obtained with commercial benzoguanamine resins, the surface coatings according invention are distinguished by increased reactivity, improved overstoving tolerance, reduced water absorption and hence improved results in the humidity test according to DIN 51,017 as well as substantially improved light stability.

The following trade marks are used in the examples below. Blanc fix micro is a registered trade mark of Sachtleben Chemie GmbH, Duisburg, Federal Republic of Germany. Printex and Aerosil are registered trade marks of Degussa AG, Frankfurt am Main, Federal Republic of Germany. Polysolvan, Additol, Synthacryl, Alftalat and Resamin are registered trade marks of Hoechst AG, Frankfurt am Main/Hochst, Federal Republic of Germany. Maprenal is a registered trade mark of Cassella AG, Frankfurt am Main/Fechenheim, Federal Republic of Germany. Stapa-Mobil is a registered trade mark of Eckart-Werke, Standard Bronzepulver-Werke Carl Eckart, GmbH & Co., Furth, Federal Republic of Germany. Tinuvin is a registered trade mark of Ciba-Geigy AG, Basel, Switzerland. Kristallöl is a registered trade mark of Deutsche Shell AG, Hamburg, Federal Republic of Germany. Nacure is a registered trade mark of King Industries, Inc. Norwalk, Conn., USA. Solvesso is a registered trade mark of Exxon, USA.

EXAMPLE 1

A mixture of 2,4-diamino-6-diethylaminotriazine ( 100 g 0.549 tool), 90% paraformaldehyde (83.3 g 2.50 tool) and n-butanol (121.8 g 1.646 mol) is heated to 80° C. for 2 h 45 min. Thereafter, 1 ml of a 10% strength sodium carbonate solution is added and heating is carried out over a water separator until less than i ml of water/5 min separates off. 80 ml of n-butanol are distilled off under reduced pressure (0.1 bar) and the mixture is adjusted to a solids content of about 70%, filtered over Celite (70° C.) and then brought to a solids content of 62% with n -butanol.

EXAMPLE 2

100 g (0.549 mol) of 2,4-diamino-6-diethylaminotriazine, 83.3 g (2.50 tool) of 90% paraformaldehyde and 121.8 g (1.646 tool) of isobutanol are reacted at 80° C. for 2 h 45 min. After the addition of 1 ml of a 10% strength sodium carbonate solution, the volatile components are removed under reduced pressure (50° C., 25 mbar) until the solids content is 75%. Thereafter, the mixture is diluted with n-butanol, filtered while hot over Celite and adjusted to a solids content of 62%.

EXAMPLE 3

100 g (0.g49 mol)of 2,4-diamino-6-diethylaminotriazine, 82.4 g (2.472 tool) of 90% paraformaldehyde and 140.6 g (4.394 tool) of methanol are heated under reflux for 3 h and the reaction mixture is brought to a pH of 10.0 with 10% strength sodium carbonate solution. Evaporation is carried out under reduced pressure (100 mbar) to an internal temperature of 108° C., 100 ml of isobutanol are added and the mixture is filtered at 70° C. over Celite and then adjusted to a solids content of 62%.

EXAMPLE 4

An automotive storing filler based on a commercial oil-free polyester resin of the following formulation was prepared:

|  | Parts by weight |
|---|---|
| Commercial oil-free polyester resin, 70% xylene (acid number max. 10, dyn. viscosity (form supplied, 23° C.): 2,300-3,100 mPa · s), e.g. ® Alftalat AN 950 | 65.40 |
| Titanium dioxide RN 59 | 32.60 |
| ® Blanc fixe micro | 32.60 |
| Rub ® Printex 300 | 0.20 |
| ® Aerosil 380 | 1.00 |
| ® Polysolvan O | 12.20 |
| Ethoxypropyl acetate | 13.00 |
| ® Solvesso 150 | 10.00 |
| ® Additol XL 480 | 0.40 |
| Isobutanol | 3.40 |
| Resin according to Example 1 | 31.64 |
| Dilution: ® Solvesso 100 | 33.00 |
| Stoving condition: 15 min at 150° C. |  |

The following data were measured:

| Processing viscosity, DIN 4 mm cup, 23° C.: | 21 s |
|---|---|
| Processing solids content (1 h, 120° C.): | 57% |
| Pendulum hardness: | 157 König seconds |
| Gloss 20°/60°: | 23%/67% |

For comparison, the above example was repeated with the difference that the resin according to Example 1 was replaced with 29.20 parts by weight of a commercial n-butyl-etherified melamine/formaldehyde resin (about 67% of n-butanol/xylene, dyn. viscosity (form supplied, 23° C.): 600 - 900 mPa.s), e.g./Maprenal VMF 3610. 34.00 parts by weight of Solvesso 100 were used for dilution:

| Processing viscosity, DIN 4 mm cup, 23° C.: | 21 s |
|---|---|
| Processing solids content (1 h, 120° C.): | 55% |
| Pendulum hardness: | 160 König seconds |
| Gloss 20°/60°: | 15%/59% |

EXAMPLE 5

A metallic base coat based on a commercial oil-free polyester resin of the following formulation was prepared:

|  | Parts by weight |
|---|---|
| Commercial oil-free polyester resin, 70% xylene (acid number max. 10, dyn. viscosity (form supplied, 23° C.): 2,300-3,100 mPa · s), e.g. ® Alftalat AN 950 | 30.00 |
| ® Resamin HF 450 | 5.00 |
| ® Stapa-Mobil R 167 | 10.00 |
| Xylene | 12.00 |
| CAB solution 381-0.1 18% butyl acetate | 110.00 |
| Resin according to Example 1 | 8.34 |
| ® Aerosil 200 | 1.80 |
| Butylglycol | 10.00 |
| Butyl acetate/xylene (1:1) | 11.80 |
| Xylene/butyl acetate/ ® Solvesso 100 (25:60:15) | 62.00 |

The following data were measured:

| Viscosity, 23° C., DIN 4 mm cup: | 49 s |
|---|---|
| Processing viscosity: | 15 s |
| Processing solids content (1 h, 125° C.) | 20% |

For comparison, the above example was replaced with the difference that the resin according to Example 1 was replaced with 94.0 parts by weight of a commercial melamine/formaldehyde resin partially etherified with isobutanol (about 55% strength in isobutanol/xylene 44:1, molar ratio melamine/formaldehyde=1:4, dyn. viscosity (form supplied, 23° C.): 260 - 460 mPa.s), e.g. Maprenal MF 590.

The following data were measured:

| Viscosity, 23° C., DIN 4 mm cup: | 34 s |
|---|---|
| Processing viscosity: | 15 s |
| Processing solids content (1 h, 125° C.) | 20% |

EXAMPLE 6

A clear coat based on commercial, externally crosslinking acrylate resins of the following formulation was prepared:

|  | Parts by weight |
|---|---|
| Commercial externally crosslinking acrylate resin, (dissolved in xylene/butanol 3:1 to give 65% strength solution, dyn. viscosity (50% strength in xylene): 1140 mPa · s/20° C., acid number 13), e.g. ® Synthacryl SC 303 | 53.85 |
| Commercial externally crosslinking acrylate resin (dissolved in ® Solvesso 100 to give a 75% strength solution, dyn. viscosity: 295 mPa · s/20° C., acid number 10), e.g. ® Synthacryl SC 370 | 46.67 |
| Resin according to Example 1 | 48.39 |
| ® Tinuvin 292 | 1.00 |
| ® Tinuvin 1130 | 1.00 |
| Isobutanol | 10.00 |
| ® Solvesso 150 | 6.00 |
| ® Kristallöl K 30 | 18.00 |
| ® Solvesso 100 | 38.00 |
| ® Additol XL 121 | 0.23 |

The following data were measured:

| Viscosity, 23° C., DIN 4 mm cup: | 26 s |
|---|---|
| Processing solids content (1 h, 125° C.) | 43% |
| Pendulum hardness: | König seconds |

|  | 100° C. 76 s | 110° C. 133 s | 120° C. 161 s | 130° C. 173 s | 140° C. 173 s | 150° C. 175 s | 160° C. 176 s |
|---|---|---|---|---|---|---|---|
| Crosshatch | 1 | 1 | 1 | 1-2 | 1-2 | 2 | 2 |
| Resistance to super-grade petrol (min) | <1 | <1 | <1 | <1 | <3 | <3 | <3 |
| Erichsen cupping (mm) | 10.0 | 9.7 | 9.6 | 9.4 | 9.3 | 8.7 | 8.1 |

| | | |
|---|---|---|
| Humidity test (240 h, 40° C., 100% rel. humidity) | Blushing | - satisfactory - | a) For comparison, the above example was repeated with the difference that the resin according to Example 1 was replaced with 54.55 parts by weight of a commercial melamine/formaldehyde resin partially etherified with isobutanol (about 55% strength in isobutanol/xylene 44:1, molar ratio melamine:formaldehyde=1:4, dyn. viscosity (form supplied, 23° C.): 300 - 500 mPa.s), e.g. Maprenal MF 650. 34 parts of Solvesso 100 were used in order to obtain the spray viscosity.

The following data were measured:

| Viscosity, 23° C., DIN 4 mm cup | | | | 26 s | | |
|---|---|---|---|---|---|---|
| Processing solids content (1 h, 125° C.) | | | | 43% | | |
| Pendulum hardness: | | | | König seconds | | |
| | 100° C. 75 s | 110° C. 102 s | 120° C. 142 s | 130° C. 164 s | 140° C. 173 s | 150° C. 175 s | 160° C. 180 s |
| Crosshatch | 1 | 1 | 2 | 3 | 3 | 4 | 4 |
| Resistance to super-grade petrol (min) | <1 | <1 | <1 | <3 | >10 <15 | >10 <15 | >10 <15 |
| Erichsen cupping (mm) | 9.9 | 9.8 | 9.6 | 8.8 | 8.1 | 7.4 | 4.9 |
| Humidity test (240 h, 40° C., 100% rel. humidity) | | Blushing | - satisfactory - | | | | | b) In a further comparison, the resin according to Example 1 was replaced with 48.39 parts by weight of a commercial benzoguanamine resin etherified with n-butanol (dissolved in n-butanol to give a solution of about 62% strength, dyn. viscosity (form supplied, 23° C.): 140 - 230 mPa.s), e.g. Maprenal MF 980. 32 parts of Solvesso 100 were used to obtain the spray viscosity.

The following data were measured:

| Viscosity, 23° C., DIN 4 mm cup | | | | 26 s | | |
|---|---|---|---|---|---|---|
| Processing solids content (1 h, 125° C.) | | | | 43% | | |
| Pendulum hardness: | | | | König seconds | | |
| | 100° C. 35 s | 110° C. 63 s | 120° C. 105 s | 130° C. 165 s | 140° C. 183 s | 150° C. 192 s | 160° C. 195 s |
| Crosshatch | 0 | 0-1 | 1-2 | 1-2 | 2 | 2 | 2 |
| Resistance to super-grade petrol (min) | <1 | <1 | <1 | <1 | <2 | <3 | <5 |
| Erichsen cupping (mm) | 10.5 | 10.0 | 9.8 | 9.6 | 9.4 | 9.0 | 8.4 |
| Humidity test (240 h, 40° C., 100% rel. humidity) | Blushing | Spotting | - Satisfactory - | | | | | c) In a further comparison, the resin according to Example 1 was replaced with 44.78 parts by weight of a commercial n-butyl-etherified melamine/formaldehyde resin (about 67% n-butanol/xylene, dyn. viscosity (form supplied, 23° C.): 600-700 mPa.s), for example Maprenal VMF 3610. 44 parts of Solvesso 100 were used to obtain the spray viscosity.

The following data were measured:

The effective gloss (%) at 20° after a number of hours in the edge filter A, Weather-o-meter, was determined for the clear coat according to the invention and for the clear coats of the prior art according to a) and b).

The following results were obtained:

| | | Prior art | |
|---|---|---|---|
| After hours | According to the invention | a) | b) |
| 0 | 90.0 | 87.0 | 90.0 |
| 250 | 89.0 | 90.0 | 87.0 |
| 500 | 86.0 | 87.0 | 40.0 |
| 750 | 83.0 | 85.0 | 20.0 |
| 1000 | 81.0 | 81.0 | — |
| 1250 | 78.0 | 82.0 | — |
| 1500 | 73.0 | 80.0 | — |
| 1750 | 67.0 | 77.0 | — |
| 2000 | — | 77.0 | — |
| 2250 | — | 73.0 | — |
| 2500 | — | 67.0 | — |

EXAMPLE 7

A total coat system, consisting of stoving filler according to Example 4, metallic base coat according to Example 5 and clear coat according to Example 6, was tested.

| Viscosity, 23° C., DIN 4 mm cup: | | | | 25 s | | |
|---|---|---|---|---|---|---|
| Processing solids content (1 h, 125° C.): | | | | 43% | | |
| Pendulum hardness: | | | | König seconds | | |
| | 100° C. 45 s | 110° C. 68 s | 120° C. 122 s | 130° C. 152 s | 140° C. 160 s | 150° C. 163 s | 160° C. 163 s |
| Crosshatch | 0 | 0-1 | 1 | 1-2 | 3 | 4 | 4 |
| Xylene resistance (min): | <1 | <1 | <1 | <3 | >5 <10 | >20 <25 | >20 <25 |
| Humidity test (240 h, 40° C., 100% rel. humidity) | Blushing | | - satisfactory - | | | | |

| Stoving conditions: | | |
|---|---|---|
| Filler: | 15 min | 150° C. |
| Base coat: | 5 min | RT |
| Clear coat: | 20 min | 140° C. |
| The following data were measured: | | |
| Pendulum hardness: | 149 s | |
| Crosshatch | Gt 0 | |
| Stone chip test VDO | KW$_4$ | |
| Water absorption in humidity test (240 h, 40° C., 100% rel. humidity): | no water absorption | |

For comparison, a total coat system, consisting of stoving filler according to Comparative Example 4, metallic base coat according to Comparative Example 5 and clear coat according to Comparative Example 6c, was tested.
The following data were measured:

| | |
|---|---|
| Pendulum hardness: | 138 s |
| Crosshatch: | Gt 0 |
| Stone chip test VDO: | KW$_4$ |
| Water absorption in humidity test: (240 h, 40° C., 100% rel. humidity). | 0.4 g/200 cm$^2$ area |

EXAMPLE 8

An aqueous stoving clear coat based on a commercial water-thinnable acrylate resin of the following formulation was prepared:

| | Parts by weight |
|---|---|
| Commercial water-thinnable acrylate resin (dissolved in water/n-BuOH 5:1 to give a solution of about 46% strength, hydroxyl number about 100 mg KOH/g solid resin, pH about 6.8–7.2, dyn. viscosity (form supplied, 20° C.): 100–500 mPa · s), e.g. ® Synthacryl VSW 1500 | 80.00 |
| Resin according to Example 1 | 15.00 |
| ® Additol XW 390 diluted in water to an active ingredient content of 5% | 0.60 |
| ® Nacure 2500, 25% (form supplied) | 0.37 |
| Propylene glycol/water mixture (1:1) | 4.03 |

The pH was adjusted to 8 with dimethylethanolamine (DMEA). The resin/curing agent ratio was 80:20.
The following data were measured:

| Pendulum hardness, stoving time: 20 min | | | | | | | | |
|---|---|---|---|---|---|---|---|---|
| 100° C. | 110° C. | 120° C. | 130° C. | 140° C. | 150° C. | 160° C. | 170° C. | 180° C. |
| 57 s | 69 s | 78 s | 82 s | 80 s | 77 s | 72 s | 75 s | 62 s |

EXAMPLE 9

Example 8 was repeated, with the difference that the resin according to Example 1 was used in an amount of 22.50 parts by weight and the propylene glycol/water mixture was used in an amount of 1.53 parts by weight. The resin/curing agent ratio was 70:30.
The following data were measured:

| Pendulum hardness, stoving time: 20 min | | | | | | | | |
|---|---|---|---|---|---|---|---|---|
| 100° C. | 110° C. | 120° C. | 130° C. | 140° C. | 150° C. | 160° C. | 170° C. | 180° C. |
| 131 s | 130 s | 143 s | 144 s | 141 s | 132 s | 111 s | 91 s | 98 s |

For comparison, the above example was repeated with the difference that the resin according to Example 1 was replaced with 22.50 parts by weight of a commercial benzoguanamine resin etherified with n-butanol (dissolved in n-BuOH to give a solution of about 62% strength, dyn. viscosity (form supplied, 23° C.): 140–230 mPa.s), e.g. Maprenal MF 980.
The following data were measured:

| Pendulum hardness, stoving time: 20 min | | | | | | | | |
|---|---|---|---|---|---|---|---|---|
| 100° C. | 110° C. | 120° C. | 130° C. | 140° C. | 150° C. | 160° C. | 170° C. | 180° C. |
| 76 s | 113 s | 135 s | 147 s | 144's | 134 s | 120 s | 94 s | 100 s |

EXAMPLE 10

Example 6 was repeated, with the difference that the resin according to Example 1 was replaced with 48.39 parts of the resin according to Example 2. 45 parts of Solvesso 100 were used to obtain the spray viscosity.
The following data were measured:

| Processing viscosity, DIN 53,211, 23° C.,: | | | | | 26 s | |
|---|---|---|---|---|---|---|
| Processing solids content (1 h, 125° C.): | | | | | 43% | |
| Pendulum hardness: | | | | | König seconds | |
| | 100° C. | 110° C. | 120° C. | 130° C. | 140° C. | 150° C. | 160° C. |
| | 102 s | 143 s | 170 s | 175 s | 178 s | 178 s | 179 s |
| Crosshatch: | 1–2 | 2 | 2 | 2 | 2–3 | 2–3 | 2–3 |
| Resistance to super-grade petrol (min): | | <1 | <1 | <1 | <1 | <2 | <2 < 2 |
| Erichsen cupping (mm): | 10.1 | 9.4 | 9.3 | 9.2 | 9.2 | 98.7 | 8.2 |
| Humidity test: (240 h, 40° C., 100% rel. humidity) | Blushing | - satisfactory - | | | | | |

EXAMPLE 11

A clear coat based on commercial, externally crosslinking acrylate resins of the following formulation was prepared:

|  | Parts by weight |
|---|---|
| Commercial externally crosslinking acrylate resin (dissolved in xylene/butanol 3:1 to give a 65% strength solution, dyn. viscosity (50% strength in xylene): 1140 mPa · s/20° C., acid number 13), e.g. ®Synthacryl SC 303 | 26.32 |
| Commercial externally crosslinking acrylate resin (dissolved in ®Solvesso 100 to give a 75% strength solution, dyn. viscosity: 295 mPa · s/20° C. acid number 10), e.g. ®Synthacryl SC 370 | 23.33 |
| Resin according to Example 3 | 24.19 |
| ®Tinuvin 292 | 0.50 |
| ®Tinuvin 1130 | 0.50 |
| Isobutanol | 5.00 |
| ®Solvesso 150 | 3.00 |
| ®Kristallöl K 30 | 9.00 |
| ®Solvesso 100 | 15.00 |
| ®Additol XL 121 | 0.11 |

The following data were measured:

| Viscosity, 23° C., DIN 53,211 | 26 s | | | | | | |
|---|---|---|---|---|---|---|---|
| Pendulum hardness: | König seconds | | | | | | |
| | 100° C. | 110° C. | 120° C. | 130° C. | 140° C. | 150° C. | 160° C. |
| | 64 s | 113 s | 171 s | 175 s | 178 s | 178 s | 178 s |
| Crosshatch: | 1-2 | 1-2 | 2 | 2 | 2 | 2 | 2 |
| Resistance to super-grade petrol (min): | | <1 | <1 | <1 | <1 | <1 | <2 < 2 |
| Humidity test: (240 h, 40° C., 100% rel. humidity) | Blushing | - satisfactory - | | | | | |

We claim:

1. Triazine/formaldehyde resin, comprising a compound of the general formula I

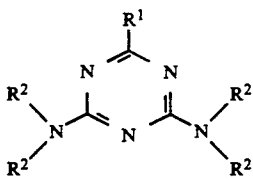

wherein
R¹ denotes di-($C_1$-$C_6$)-alkylamino, dicyclohexylamino, diphenylamino, morpholino, piperidino or pyrrolidino,
and the four substituents of R² are selected from the groups consisting of
a) which denotes hydrogen,
b) which denotes R³OCH₂-, wherein R³ denotes hydrogen or ($C_1$-$C_4$)-alkyl, and
c) which denotes a radical of the general formula II

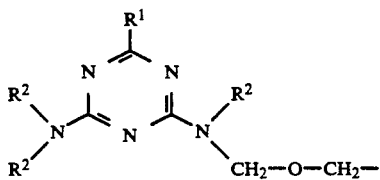

and/or a radical of the general formula III

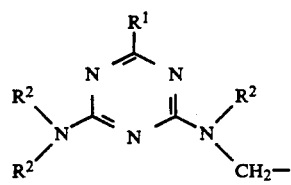

wherein R¹ and R² have the abovementioned meanings; and wherein the four substituents of R² from formula (I) consist of
0 to 3 substituents from group a);
1 to 4 substituents from group b); and
0 to 4 substituents from group c).

2. Triazine/formaldehyde resin according to claim 1, wherein R¹ denotes di-($C_1$-$C_6$)-alkylamino.

3. Triazine/formaldehyde resin according to claim 1, wherein R¹ denotes diethylamino.

4. Triazine/formaldehyde resin according to claim 1, comprising about 60 to about 80% by weight of a compound of the general formula I according to claim 1, and about 20 to about 40% by weight of a ($C_1$-$C_4$)-alkanol.

5. Triazine/formaldehyde resin according to claim 4, wherein said alkanol is n-butanol or isobutanol.

* * * * *